United States Patent Office 3,051,730
Patented Aug. 28, 1962

3,051,730
DERIVATIVES OF Δ¹-ANDROSTEN-17β-OL
Albert Bowers, John Edwards, and James C. Orr, all of Mexico City, Mexico, assignors, by mesne assignments, to Syntex Corporation, a corporation of Panama
No Drawing. Filed Sept. 29, 1961, Ser. No. 141,604
21 Claims. (Cl. 260—397.1)

The present invention relates to novel cyclopentanophenanthrene derivatives and to a process for the production thereof.

More particularly the present invention relates to the derivatives of 2-formyl-Δ¹-androsten-17β-ol, 2-hydroxymethyl-Δ¹-androsten-17β-ol, 2-carboxy-Δ¹-androsten-17β-ol, and 2-methyl-Δ¹-androsten-17β-ol.

The novel compounds of the present invention are represented by the following formulas:

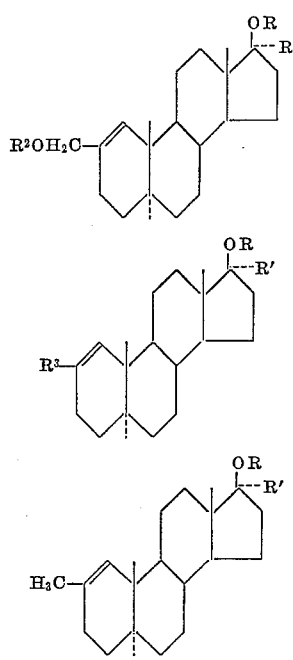

In the above formulas, R and R² represent hydrogen or a hydrocarbon carboxylic acyl group of less than 12 carbon atoms; R¹ represents hydrogen or an alkyl, alkenyl or alkinyl group containing of up to 8 carbon atoms; R³ represents formyl (—CHO) or carboxyl (—COOH).

The acyl group is derived from hydrocarbon carboxylic acids containing less than 12 carbon atoms which may be saturated or unsaturated, of straight, branched, cyclic or cyclic-aliphatic chain aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are androgenic anabolic agents with a favourable anabolic ratio. They also exhibit anti-estrogenic and antigonadotrophic activities, lower the blood chloesterol level and are useful in the treatment of premenstrual tension.

The novel compounds of the present invention are prepared by the process illustrated by the following equation:

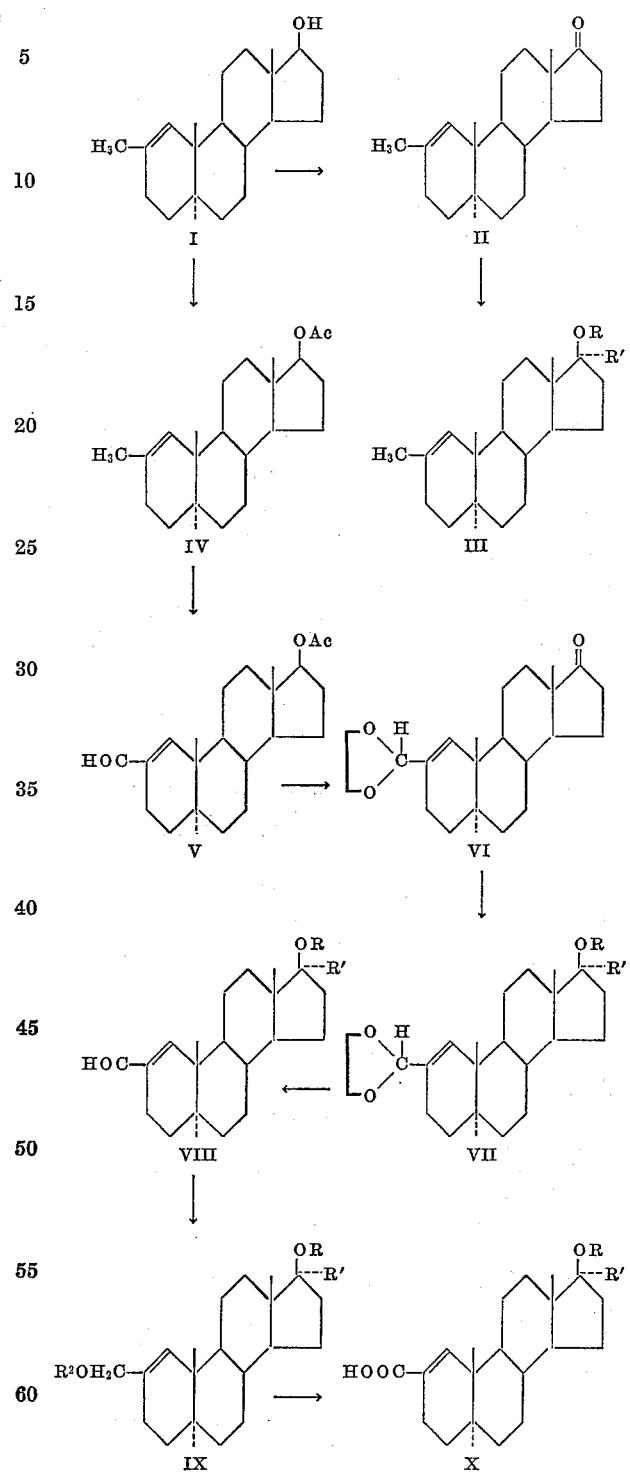

In the above formulas R, R¹ and R² have the same meaning as hereinbefore set forth.

In practicing the process outlined above, the starting compound, 2-methyl-Δ¹-androsten-17β-ol (I), is prepared by treating 2-methyl-Δ¹-androsten-17β-ol-3-one (described by Ringold et al., U.S. Patent application Serial No. 73,993, filed December 6, 1960) with ethanedithiol in the presence of an acid, such as an acetic acid solution of hydrogen chloride, thus furnishing the corresponding dithioketal, which upon treatment with Raney nickel affords 2-methyl-Δ¹-androsten-17β-ol (I). This compound upon oxidation, preferably with chromium trioxide in pyridine furnishes the corresponding 17-ketone (II). Treatment of this ketone with an alkyl, alkenyl or alkinyl magnesium halide as for example methyl, vinyl or ethinyl magnesium bromide affords the respective 2-methyl-17α-substituted Δ¹-androsten-17β-ol derivative (III; R=H).

Following a second sequence of reactions, 2-methyl-Δ¹-androsten-17β-ol (I), after conventional acetylation (IV), is treated with selenium dioxide in a suitable solvent such as dioxane or acetic acid at reflux temperature for a period of time of the order of 2 hours, thus furnishing 2-formyl-Δ¹-androsten-17β-ol-17-acetate (V). Treatment of this compound with ethylene glycol in an acid medium, reaction of the resulting 2-cycloethylenedioxymethyl derivative with a base to give the free 17β-alcohol and subsequent oxidation of the hydroxyl group preferably with chromium trioxide-pyridine, furnishes the 2 - cycloethylenedioxymethyl - Δ¹ - androsten - 17 - one (VI). Treatment of this compound with an alkyl, alkenyl or alkinyl magnesium halide affords the corresponding 17α-alkyl, alkenyl or alkinyl-17β-alcohol (VII). Hydrolysis of the acetal group in a mild acid medium affords the corresponding 2-formyl-Δ¹-androsten-17β-ol derivative (VIII; R=H). Reduction of this derivative, preferably with sodium borohydride gives the respective 2-hydroxymethyl-Δ¹-androsten-17β-ol compound (IX; R=R²=H). Treatment of this derivative with a suitable oxidizing agent, such as Jones' reagent affords the corresponding 2-carboxy compound (X; R=H).

The above compounds having a primary hydroxyl, such as the hydroxymethyl group (IX; R²=H) and/or a secondary hydroxyl such as the 17β-hydroxyl of the 17α-unsubstituted compounds (III, VIII, IX, X; R=R¹=H), are conventionally acylated in pyridine with a suitable acylating agent, such as an anhydride of a hydrocarbon carboxylic acid of the type described hereinbefore, thus furnishing the corresponding acyloxy derivatives (III, VIII, IX, X; R=acyloxy, R¹=H, R²=acyloxy).

The compounds with a tertiary hydroxyl in the molecule, such as the 17α-substituted 17β-alcohols (III, VIII, IX, X; R=H, R¹=hydrocarbon) are conventionally acylated in the presence of p-toluenesulfonic acid with a suitable acylating agent, such as an anhydride of a hydrocarbon carboxylic acid of the type described hereinbefore, to give the corresponding acyloxy derivatives (III, VIII, IX, X; R=acyloxy, R¹=hydrocarbon).

The following specific examples serve to illustrate but are not intended to limit the scope of the present invention:

*Example I*

A solution of 5 g. of 2-methyl-Δ¹-androsten-17β-ol-3-one in 100 cc. of glacial acetic acid containing 5 cc. of ethanedithiol and 4 cc. of a saturated solution of hydrogen chloride in acetic acid was allowed to stand at room temperature for 4 hours. Water was added and the resulting mixture was saturated with ethyl acetate. The extract was washed with a 5% aqueous sodium bicarbonate solution, water, dried over sodium sulfate and evaporated to dryness. Recrystallization from ether-hexane afforded the cycloethylene dithioketal of 2-methyl-Δ¹-androsten-17β-ol-3-one.

A solution of 4 g. of the foregoing compound dissolved in 3 lt. of ethanol (previously distilled over Raney nickel) was boiled under reflux for 6 hours with 50 g. of Raney nickel. The metal was removed by filtration and washed well with hot ethanol. The filtrate was evaporated to dryness, dissolved in chloroform and washed with dilute hydrochloric acid, sodium carbonate solution and water. Drying, evaporation and crystallization of the residue from acetone-hexane furnished 2-methyl-Δ¹-androsten-17β-ol.

*Example II*

A mixture of 3 g. of the foregoing steroid, 12 cc. of pyridine and 6 cc. of acetic anhydride was kept at room temperature overnight, poured into ice water, the formed precipitate was filtered off, washed with water and dried. Crystallization from acetone-hexane gave 2-methyl-Δ¹-androsten-17β-ol-17-acetate.

*Example III*

A mixture of 2 g. of the last named steroid, 80 cc. of dioxane and 2 g. of recently sublimed selenium dioxide was refluxed for 2 hours, cooled, filtered through celite and the filtrate was evaporated under reduced pressure. Alumina chromatography of the residue and crystallization of the solid fractions from acetone-hexane furnished 2-formyl-Δ¹-androsten-17β-ol-17-acetate.

*Example IV*

A mixture of 5 g. of 2-formyl-Δ¹-androsten-17β-ol-17-acetate prepared in accordance with Example III, 150 cc. of anhydrous benzene, 60 cc. of ethyleneglycol distilled over sodium hydroxide in 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 2-cycloethylenedioxymethyl-Δ¹-androsten-17β-ol-17-acetate.

*Example V*

A solution of 4 g. of the foregoing steroid in 150 cc. of methanol was refluxed for 3 hours with 2 g. of potassium hydroxide dissolved in 4 cc. of water; it was then poured into ice water, the precipitate collected, washed with water to neutral and dried, thus producing a crude compound which upon recrystallization from methylene-chloride-ether afforded 2-cycloethylenedioxymethyl-Δ¹-androsten-17β-ol.

*Example VI*

A solution of 3 g. of the above steroid in 60 cc. of pyridine was added to a mixture of 3 g. of chromic trioxide in 60 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2-cycloethylenedioxymethyl-Δ¹-androsten-17-one.

*Example VII*

A solution of 5 g. of 2-cycloethylenedioxymethyl-Δ¹-androsten-17-one, obtained according to Example VI, in 250 cc. of thiophene-free benzene was treated with 27.5 cc. of 4 N methyl magnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 2-cycloethylenedioxymethyl-17α-methyl-Δ¹-androsten-17β-ol.

Following exactly the above procedure except that methyl magnesium bromide was substituted by vinyl magnesium bromide and ethynyl magnesium bromide, there were correspondingly obtained 2-cycloethylenedioxymethyl-17α-vinyl-Δ¹-androsten-17β-ol, and 2-cycloethylenedioxymethyl-17α-ethynyl-Δ¹-androsten-17β-ol.

Example VIII

A solution of 4 g. of 2-cycloethylenedioxymethyl-17α-methyl-Δ¹-androsten-17β-ol in 200 cc. of acetone was treated with 0.8 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 2-formyl-17α-methyl-Δ¹-androsten-17β-ol.

Following the same technique, there were treated 2-cycloethylenedioxymethyl-Δ¹-androsten-17β-ol-17-acetate, 2-cycloethylenedioxymethyl-17α-vinyl-Δ¹-androsten-17β - ol, and 2-cycloethylenedioxymethyl-17α-ethynyl-Δ¹ - androsten-17β-ol, thus affording correspondingly 2-formyl-Δ¹-androsten-17β-ol-17-acetate, 2-formyl-17α-vinyl-Δ¹ - androsten-17β-ol, and 2-formyl-17α-ethynyl-Δ¹-androsten-17β-ol.

Example IX

A solution of 3 g. of sodium borohydride in 9 cc. of water was added to an ice-cooled solution of 3 g. of 2-formyl-17α-methyl-Δ¹-androsten-17β-ol in 250 cc. of methanol and the mixture was allowed to stand for 6 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 2-hydroxymethyl-17α-methyl-Δ¹-androsten-17β-ol.

Following the same procedure, there were treated 2-formyl-Δ¹-androsten-17β-ol-17-acetate, 2 - formyl - 17α-vinyl-Δ¹-androsten-17β-ol, and 2-formyl-17α-ethynyl-Δ¹-androsten-17β-ol, thus affording respectively 2-hydroxymethyl-Δ¹-androsten-17β-ol-17-acetate, 2-hydroxymethyl-17α-vinyl-Δ¹-androsten-17β-ol, and 2-hydroxymethyl-17α-ethynyl-Δ¹-androsten-17β-ol.

Example X

A solution of 1 g. of 2-hydroxymethyl-17α-methyl-Δ¹-androsten-17β-ol in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture for three minutes. It was stirred for 5 minutes further at 0–5° C. and diluted with water. The precipitate was collected, washed with water and dried under vacuum, thus affording a crude product which upon crystallization from acetone-hexane gave 2-carboxy-17α-methyl-Δ¹-androsten-17β-ol.

When applying the above technique to 2-hydroxymethyl-Δ¹-androsten-17β-ol-17 acetate, 2-hydroxymethyl-17α-vinyl-Δ¹-androsten-17β-ol, and 2-hydroxymethyl-17α-ethynyl-Δ¹-androsten-17β-ol, there were correspondingly obtained 2-carboxy-Δ¹-androsten-17β-ol-17 - acetate, 2-carboxy-17α-vinyl-Δ¹-androsten-17β-ol, and 2-carboxy-17α-ethynyl-Δ¹-androsten-17β-ol.

Example XI

2 - formyl-Δ¹-androsten-17β-ol-17-acetate, 2 - hydroxymethyl-Δ¹-androsten-17β-ol-17-acetate, and 2-carboxy-Δ¹-androsten-17β-ol-17-acetate were saponified following the technique described in Example V furnishing respectively 2-formyl-Δ¹-androsten-17β-ol, 2 - hydroxymethyl - Δ¹-androsten-17β-ol, and 2-carboxy-Δ¹-androsten-17β-ol.

Example XII 5 g. of 2-methyl-Δ¹-androsten-17β-ol obtained in accordance with Example I were oxidized following the procedure delineated in Example VI, thus giving 2-methyl-Δ¹-androsten-17-one.

Example XIII

The foregoing steroid was treated by the method described in Example VII, affording 2,17α-dimethyl-Δ¹-androsten-17β-ol.

By the same procedure, but sustituting methyl magnesium bromide by vinyl magnesium bromide and ethynyl magnesium bromide, there were respectively obtained 2-methyl-17α-vinyl-Δ¹-androsten-17β-ol, and 2 - methyl-17α-ethynyl-Δ¹-androsten-17β-ol.

Example XIV

A mixture of 1 g. of 2-hydroxymethyl-17α-methyl-Δ¹-androsten-17β-ol, 4 cc. of pyridine and 2 cc. of acetic anhydride was kept at room temperature overnight. Then it was poured into water, the formed precipitate filtered off, washed with water and dried. Crystallization from acetone-hexane gave 2-acetoxymethyl-17α-methyl-Δ¹-androsten-17β-ol.

Following the above technique, there were treated the starting compounds listed below with the indicated acylating agent furnishing the corresponding products hereinafter set forth:

| Starting compounds | Acylating agent | Products |
| --- | --- | --- |
| 2-hydroxymethyl-17α-methyl-Δ¹-androsten-17β-ol. | propionic anhydride | 2-propionoxymethyl-17α-methyl-Δ¹-androsten-17β-ol. |
| 2-hydroxymethyl-17α-vinyl-Δ¹-androsten-17β-ol. | acetic anyhdride | 2-acetoxymethyl-17α-vinyl-Δ¹-androsten-17β-ol. |
| Do | caproic anhydride | 2-caproxymethyl-17α-vinyl-Δ¹-androsten-17β-ol. |
| 2-hydroxymethyl-17α-ethynyl-Δ¹-androsten-17β-ol. | propionic anhydride | 2-propionoxymethyl-17α-ethynyl-Δ¹-androsten,17β-ol. |
| Do | cyclopentyl-propionic anhydride. | 2-cyclopentylpropionoxymethyl-17α-ethynyl-Δ¹-androsten-17β-ol. |
| Do | benzoyl chloride | 2-benzoxymethyl-17α-ethynyl-Δ¹-androsten-17β-ol. |
| 2-hydroxymethyl-Δ¹-androsten-17β-ol. | propionic anhydride | 2-propionoxymethyl-Δ¹-androsten-17β-ol-17-propionate. |
| Do | caproic anhydride | 2-caproxymethyl-Δ¹-androsten-17β-ol-17-caproate. |
| 2-hydroxymethyl-Δ¹-androsten-17β-ol-17-acetate. | cyclopentyl-propionic anhydride. | 2-cyclopentylpropionoxymethyl-Δ¹-androsten-17β-ol-17-acetate. |
| Do | benzoyl chloride | 2-benzoxymethyl-Δ¹-androsten-17β-ol-17-acetate. |
| 2-formyl-Δ¹-androsten-17β-ol | propionic anhydride | 2-formyl-Δ¹-androsten-17β-ol-17-propionate. |
| Do | caproic anhydride | 2-formyl-Δ¹-androsten-17β-ol-17-caproate. |
| 2-carboxy-Δ¹-androsten-17β-ol | propionic anhydride | 2-carboxy-Δ¹-androsten-17β-ol-17-propionate. |
| Do | benzoyl chloride | 2-carboxy-Δ¹-androsten-17β-ol-17-benzoate. |

Example XV

A mixture of 1 g. of 2-formyl-17α-methyl-Δ¹-androsten-17β-ol, 1 g. of p-toluenesulfonic acid monohydrate, 50 cc. of acetic acid and 25 cc. of acetic anhydride was kept for 24 hours at room temperature. It was then poured into water and stirred until the excess of anhydride had hydrolyzed. Isolation of the product by methylene chloride extraction and crystallization of the residue from acetone-ether gave 2-formyl-17α-methyl-Δ¹-androsten-17β-ol-17-acetate.

The starting compounds listed below were treated by the above technique with the indicated anhydride, affording the corresponding products hereinafter set forth:

sisting of hydrogen, an alkyl, an alkenyl and an alkynyl group each containing less than 8 carbon atoms.

2. 2-methyl-Δ¹-androsten-17β-ol.
3. 2,17α-dimethyl-Δ¹-androsten-17β-ol.
4. 2-methyl-17α-vinyl-Δ¹-androsten-17β-ol.
5. 2-methyl-17α-ethynyl-Δ¹-androsten-17β-ol.
6. 2-methyl-Δ¹-androsten-17β-ol-17-acetate.

| Starting compounds | Anhydride | Products |
|---|---|---|
| 2-formyl-17α-methyl-Δ¹-androsten-17β-ol. | propionic | 17-propionate of 2-formyl-17α-methyl-Δ¹-androsten-17β-ol. |
| 2-formyl-17α-vinyl-Δ¹-androsten-17β-ol. | acetic | 17-acetate of 2-formyl-17α-vinyl-Δ¹-androsten-17β-ol. |
| Do | caproic | 17-caproate of 2-formyl-17α-vinyl-Δ¹-androsten-17β-ol. |
| 2-formyl-17α-ethynyl-Δ¹-androsten-17β-ol. | propionic | 17-propionate of 2-formyl-17α-ethynyl-Δ¹-androsten-17β-ol. |
| Do | cyclopentyl-propionic | 17-cyclopentylpropionate of 2-formyl-17α-ethynyl-Δ¹-androsten-17β-ol. |
| 2-carboxy-17α-methyl-Δ¹-androsten-17β-ol. | acetic | 17-acetate of 2-carboxy-17α-methyl-Δ¹-androsten-17β-ol. |
| Do | caproic | 17-caproate of 2-carboxy-17α-methyl-Δ¹-androsten-17β-ol. |
| 2-carboxy-17α-vinyl-Δ¹-androsten-17β-ol. | propionic | 17-propionate of 2-carboxy-17α-vinyl-Δ¹-androsten-17β-ol. |
| Do | cyclopentyl-propionic | 17-cyclopentyl-propionate of 2-carboxy-17α-vinyl-Δ¹-androsten-17β-ol. |
| 2-carboxy-17α-ethynyl-Δ¹-androsten-17β-ol. | acetic | 17-acetate of 2-carboxy-17α-ethynyl-Δ¹-androsten-17β-ol. |
| Do | caproic | 17-caproate of 2-carboxy-17α-ethynyl-Δ¹-androsten-17β-ol. |
| 2,17α-dimethyl-Δ¹-androsten-17β-ol. | acetic | 17-acetate of 2,17α-dimethyl-Δ¹-androsten-17β-ol. |
| Do | cyclopentyl-propionic | 17-cyclopentyl-propionate of 2,17α-dimethyl-Δ¹-androsten-17β-ol. |
| 2-methyl-17α-vinyl-Δ¹-androsten-17β-ol. | propionic | 17-propionate of 2-methyl-17α-vinyl-Δ¹-androsten-17β-ol. |
| Do | caproic | 17-caproate of 2-methyl-17α-vinyl-Δ¹-androsten-17β-ol. |
| 2-methyl-17α-ethynyl-Δ¹-androsten-17β-ol. | acetic | 17-acetate of 2-methyl-17α-ethynyl-Δ¹-androsten-17β-ol. |
| Do | propionic | 17-propionate of 2-methyl-17α-ethynyl-Δ¹-androsten-17β-ol. |
| 2-hydroxymethyl-17α-methyl-Δ¹-androsten-17β-ol. | acetic | 2-acetoxymethyl-17α-methyl-Δ¹-androsten-17β-ol-17-acetate. |
| Do | caproic | 2-caproxymethyl-17α-methyl-Δ¹-androsten-17β-ol-17-caproate. |
| 2-hydroxymethyl-17α-vinyl-Δ¹-androsten-17β-ol. | acetic | 2-acetoxymethyl-17α-vinyl-Δ¹-androsten-17β-ol-17-acetate. |
| Do | propionic | 2-propionoxymethyl-17α-vinyl-Δ¹-androsten-17β-ol-17-propionate. |
| 2-hydroxymethyl-17α-ethynyl-Δ¹-androsten-17β-ol. | do | 2-propionoxymethyl-17α-ethynyl-Δ¹-androsten-17β-ol-17-propionate. |
| Do | caproic | 2-caproxymethyl-17α-ethynyl-Δ¹-androsten-17-caproate |
| 2-propionoxymethyl-17α-methyl-Δ¹-androsten-17β-ol. | acetic | 17-acetate of 2-propionoxymethyl-17α-methyl-Δ¹-androsten-17β-ol. |
| 2-acetoxymethyl-17α-vinyl-Δ¹-androsten-17β-ol. | propionic | 17-propionate of 2-acetoxymethyl-17α-vinyl-Δ¹-androsten-17β-ol. |
| 2-propionoxymethyl-17α-ethynyl-Δ¹-androsten-17β-ol. | caproic | 17-caproate of 2-propionoxymethyl-17α-ethynyl-Δ¹-androsten-17β-ol. |

We claim:
1. A compound of the following formula:

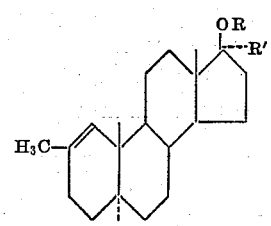

wherein R is selected from the group consisting of hydrogen and a hydrocarbon carboxylic acyl group of less than 12 carbon atoms, and R¹ is selected from the group con- 7. A compound of the following formula:

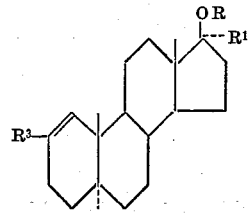

wherein R is selected from the group consisting of hydrogen and a hydrocarbon carboxylic acyl group of less than 12 carbon atoms; R¹ is selected from the group consisting of hydrogen, an alkyl, an alkenyl and an alkynyl group each containing less than 8 carbon atoms; and R³ is selected from the group consisting of formyl (—CHO) and carboxyl (—COOH).

8. 2-formyl-Δ¹-androsten-17β-ol.
9. 2-formyl-17α-methyl-Δ¹-androsten-17β-ol.
10. 2-formyl-17α-vinyl-Δ¹-androsten-17β-ol.
11. 2-formyl-17α-ethynyl-Δ¹-androsten-17β-ol.
12. 2-carboxy-Δ¹-androsten-17β-ol.
13. 2-carboxy-17α-methyl-Δ¹-androsten-17β-ol.
14. 2-carboxy-17α-vinyl-Δ¹-androsten-17β-ol.
15. 2-carboxy-17α-ethynyl-Δ¹-androsten-17β-ol.
16. A compound of the following formula:

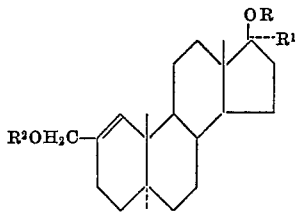

wherein R and R² are selected from the group consisting of hydrogen and a hydrocarbon carboxylic acyl group of less than 12 carbon atoms; and R¹ is selected from the group consisting of hydrogen, an alkyl, an alkenyl and an alkynyl group each containing less than 8 carbon atoms.

17. 2-hydroxymethyl-Δ¹-androsten-17β-ol.
18. 2-hydroxymethyl-17α-methyl-Δ¹-androsten-17β-ol.
19. 2-hydroxymethyl-17α-vinyl-Δ¹-androsten-17β-ol.
20. 2 - hydroxymethyl - 17α - ethynyl - Δ¹ - androsten-17β-ol.
21. 2 - propionoxymethyl - Δ¹ - androsten - 17β - ol-17-propionate.

No references cited.